(12) United States Patent
Davé

(10) Patent No.: US 7,987,286 B1
(45) Date of Patent: Jul. 26, 2011

(54) DISTRIBUTED SITUATION AWARENESS PING-BASED COMMUNICATION SYSTEM (DAPICS)

(75) Inventor: Nikhil Davé, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 324 days.

(21) Appl. No.: 12/326,474

(22) Filed: Dec. 2, 2008

(51) Int. Cl.
*G06F 15/16* (2006.01)
(52) U.S. Cl. ......... 709/236; 709/224; 709/232; 709/238
(58) Field of Classification Search .................. 709/236
See application file for complete search history.

(56) References Cited

U.S. PATENT DOCUMENTS

| | | | | |
|---|---|---|---|---|
| 7,133,800 | B2 * | 11/2006 | Delin et al. | 370/503 |
| 7,818,795 | B1 * | 10/2010 | Arad | 726/13 |
| 2008/0195688 | A1 * | 8/2008 | Watanabe | 709/201 |

OTHER PUBLICATIONS

Pending, unpublished U.S. Appl. No. 12/020,750, by Nikhil Davé et al., titled, "Ping Based Communication System (PICS)," filed Jan. 28, 2008.

* cited by examiner

*Primary Examiner* — Dohm Chankong
*Assistant Examiner* — Neeraj Utreja
(74) *Attorney, Agent, or Firm* — Kyle Eppele; J. Eric Anderson

(57) ABSTRACT

A communication method comprising the steps of: a) receiving object of interest detection data from a sensor that is operatively coupled to a first computer node in a wireless network of Unix-like computer nodes; b) transforming the object of interest detection data into an informational payload of a ping packet; and c) propagating the payload via echo-replies and echo-requests to all computer nodes in the network.

18 Claims, 12 Drawing Sheets

```
                    ┌──────────────────────────────────────────────┐
                    │ Receiving object of interest detection from a sensor │  22
                    │ that is operatively coupled to a first computer node in a │
                    │ wireless network of Unix-like computer nodes. │
                    └──────────────────────────────────────────────┘
                                           │
                                           ▼
                    ┌──────────────────────────────────────────────┐
                    │  Transforming the object of interest detection data │  24
                    │  into an informational payload of a ping packet. │
                    └──────────────────────────────────────────────┘
                                           │
                                           ▼
                    ┌──────────────────────────────────────────────┐
                    │  Propagating the payload via echo-replies and echo- │  26
                    │  requests to all computer nodes in the network. │
                    └──────────────────────────────────────────────┘
```

*Fig. 2*

DISTRIBUTED SITUATION AWARENESS PING-BASED COMMUNICATION SYSTEM (DAPICS)

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, San Diego, Code 2112, San Diego, Calif., 92152; voice (619) 553-2778; email T2@spawar.navy.mil. Reference Navy Case Number 99120.

BACKGROUND OF THE INVENTION

This invention relates to systems and methods for communicating object detection data over wireless networks.

SUMMARY

Disclosed herein is a communication method comprising the steps of: (a) receiving object of interest detection data from a sensor that is operatively coupled to a first computer node in a wireless network of Unix-like computer nodes; (b) transforming the object of interest detection data into an informational payload of a ping packet; and (c) propagating the payload via echo-replies and echo-requests to all computer nodes in the network.

BRIEF DESCRIPTION OF THE DRAWINGS

Throughout the several views, like elements are referenced using like references. The figures are not drawn to scale.

FIG. 2 is a flowchart of one embodiment of the DAPICS method.

DETAILED DESCRIPTION OF EMBODIMENTS

Information may be communicated between local and remote unix-like (e.g. Linux®) computers through a ping-based communications system (PICS) that is described in further detail in U.S. patent application Ser. No. 12/020,750, titled "Ping-Based Communications System (PICS)," which is incorporated by reference herein in its entirety. PICS utilizes Internet Control Message Protocol (ICMP) packets in unix-like system environments. ICMP packets provide the advantage of being granted top, non-preemptive priority on the internet by all routers—avoiding some of the range of ordinary delays encountered by other informational traffic on an Internet Protocol (IP) network. The PICS method may be utilized to rapidly spread object of interest detection information from one computer node to another in a wireless network of computer nodes.

Figure 1:
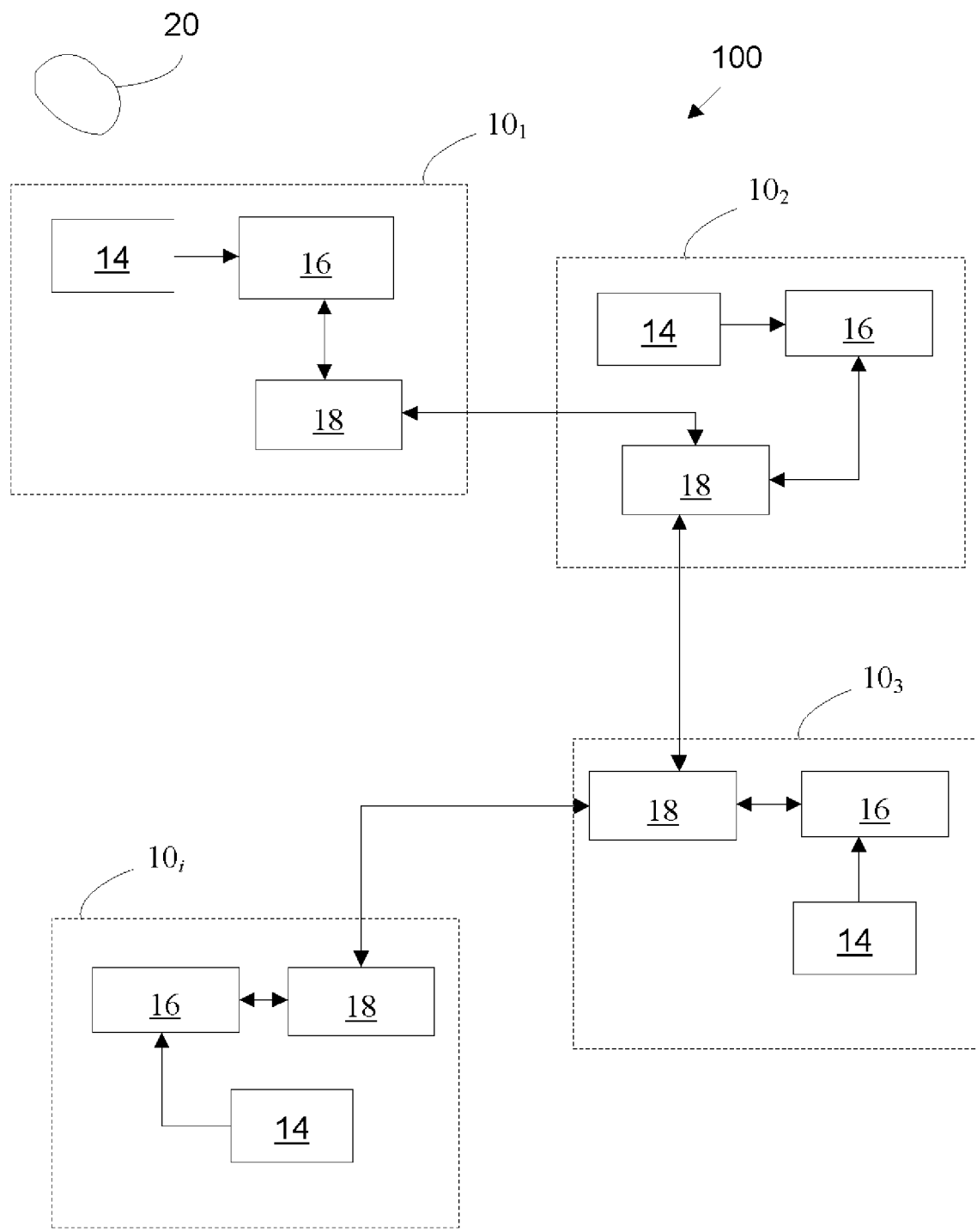
FIG. 1 shows a wireless network of computer nodes.

FIG. 1 shows a wireless network 100 of computer nodes $10_1$-$10_i$ that may be utilized in distributed situation awareness PICs (DAPICS) method 12, discussed below in reference to FIG. 2. As shown in FIG. 1, each computer node 10 comprises a sensor 14, a computer 16, and a transceiver 18. The sensor 14 may be any sensor that is capable of detecting an object of interest 20. For example, the sensor 14 may be, but is not limited to, a motion detector, a heat sensor, a pressure sensor, etc. The sensor 14 is operatively coupled to the computer 16 such that the sensor 14 can send object detection information to the computer 16. Also coupled to the computer 16 is a transceiver 18 configured to send and transmit radio signals. The computer 16 may be any computer utilizing a UNIX® operating system or any computer with a unix-like operating system. A unix-like operating system may be any operating system that functions in a manner similar to UNIX® operating systems (e.g. Linux® operating systems)) and can be defined as any system that behaves in a manner consistent with the Single UNIX® Specification, as published by The Austin Group and based upon previous standards published by IEEE and The Open Group. The computer nodes 10 may be stationary or mounted to mobile platforms.

FIG. 2 is a flowchart of one embodiment of the DAPICS method 12. The first step of the DAPICS method 12, shown in FIG. 2 as step 22, comprises receiving object of interest detection data from a sensor 14 that is operatively coupled to a first computer node 10 in a wireless network 100 of Unix-like computer nodes 10. Next, in step 24, the object of interest detection data is transformed into an informational payload of a ping packet. The informational payload may comprise, but is not limited to, time of detection information, geo-coordinates of the object of interest 20, and/or other characteristics of the object of interest 20. Finally, in step 26, the payload is propagated via echo-replies and echo-requests to all computer nodes 10 in the network 100.

Figure 3:
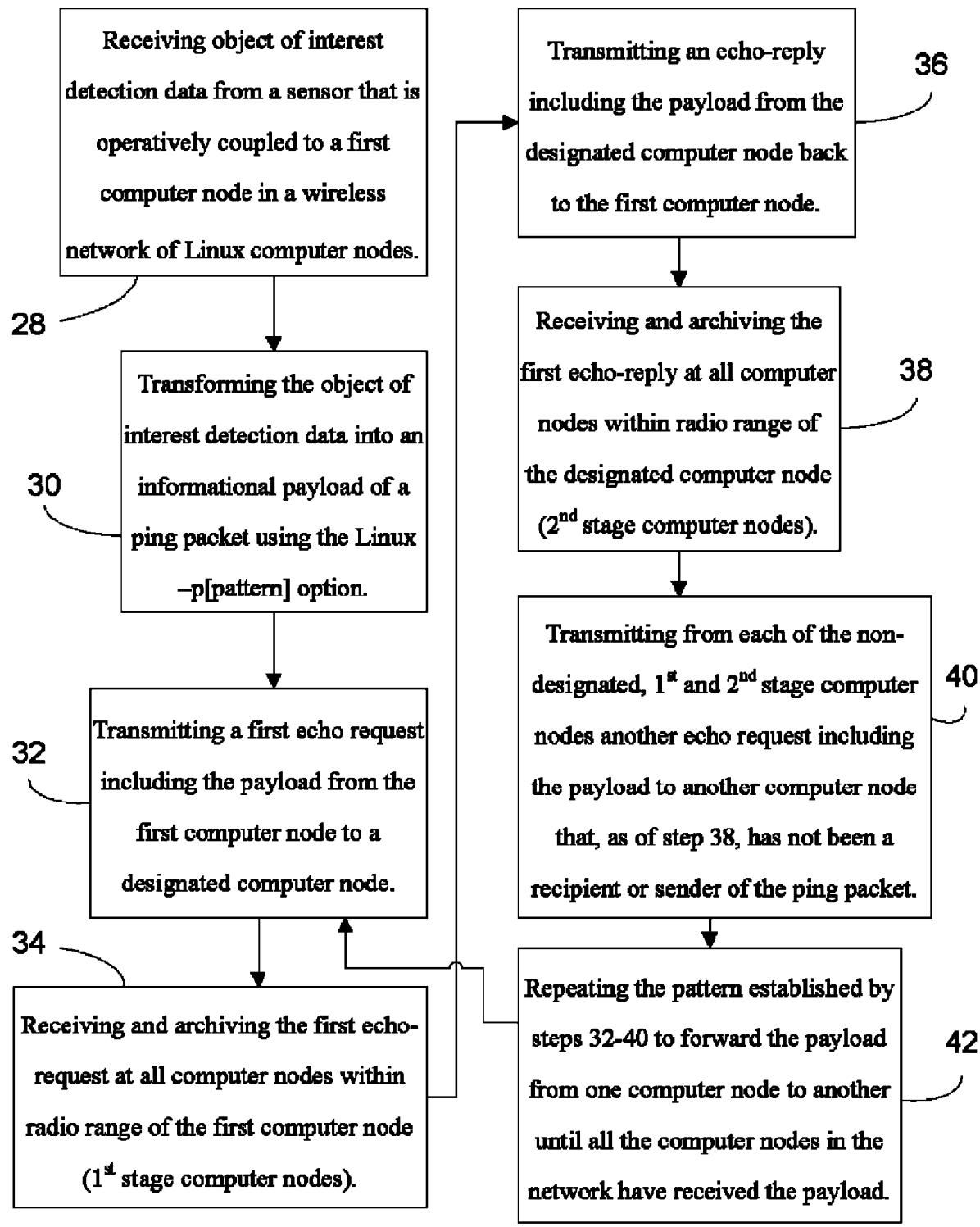
FIG. 3 is a flowchart of another embodiment of the DAPICS method.

FIG. 3 shows a flowchart of another embodiment of the DAPICS method 12. In this embodiment, as shown in FIG. 3, step 28 provides for receiving object of interest detection data from a sensor 14 that is operatively coupled to a first computer node 10 in a wireless network 100 of Linux computer nodes. Next, step 30 provides for transforming the object of interest detection data into an informational payload of a ping packet using the Linux -p[pattern] option. Step 32 provides for transmitting a first echo request including the payload from the first computer node to a designated computer node. Step 34 provides for receiving and archiving the first echo-request at all computer nodes within radio range of the first computer node ($1^{st}$ stage computer nodes). The echo-replies and echo-requests can be received and archived by using any ICMP packet capture utility that allows a user to intercept and display ICMP packets that are being transmitted or received in a wireless network of computers. A suitable example of an ICMP packet capture utility is tcpdump (reference the command 'man tcpdump' in unix-like systems). The ICMP packet capture utility may continue to run indefinitely in the background of the computers 16 of each computer node 10.

Also in reference to FIG. 3, step 36 notes the automatic transmitting, per the ping protocol (reference the command 'man ping' in unix-like systems), an echo-reply including the payload from the designated computer node back to the first computer node. The designated computer node's transmitted echo-reply contains the same informational payload as the echo-request (i.e. it is a "full packet" acknowledgement) back to the first computer node. All other computer nodes 10 within radio range of the designated computer node 10 receive and archive the echo-reply from the second computer node 10 ($2^{nd}$ stage computer nodes), shown as Step 38 in FIG. 3. Next, step 40 provides for transmitting from each of the non-designated, $1^{st}$ and $2^{nd}$ stage computer nodes another echo request including the payload to another computer node that, as of step 38, has not been a recipient or sender of the ping packet. Finally, step 42 provides for repeating the pattern established by steps 32-40 to forward the payload from one computer node to another until all the computer nodes in the network have received the payload. (In returning to step 32 from step 42, the natural interpretation of the nomenclature 'first' and 'designated' computer nodes must now apply to those nodes involved in the second and later repeats of the pattern, and not to those nodes in the previous repeat.)

Some details of DAPICS are specified for convenience in what follows: A given computer node can conclude with certainty that a neighboring node has received a given information payload ONLY if former node has received/archived either an echo-request or echo-reply from latter node containing that given information payload. Each computer node 10 can determine which other computer nodes 10 are within radio range based upon its local archived history of echo-requests and echo-replies. If any computer node 10 has already sent either an echo-request or an echo-reply containing a given informational payload and subsequently receives and archives an echo-reply or an echo-request with the same informational payload, the computer node 10 may be configured to refrain from sending a new echo-request with the same informational payload to another computer node 10.

Figure 4:
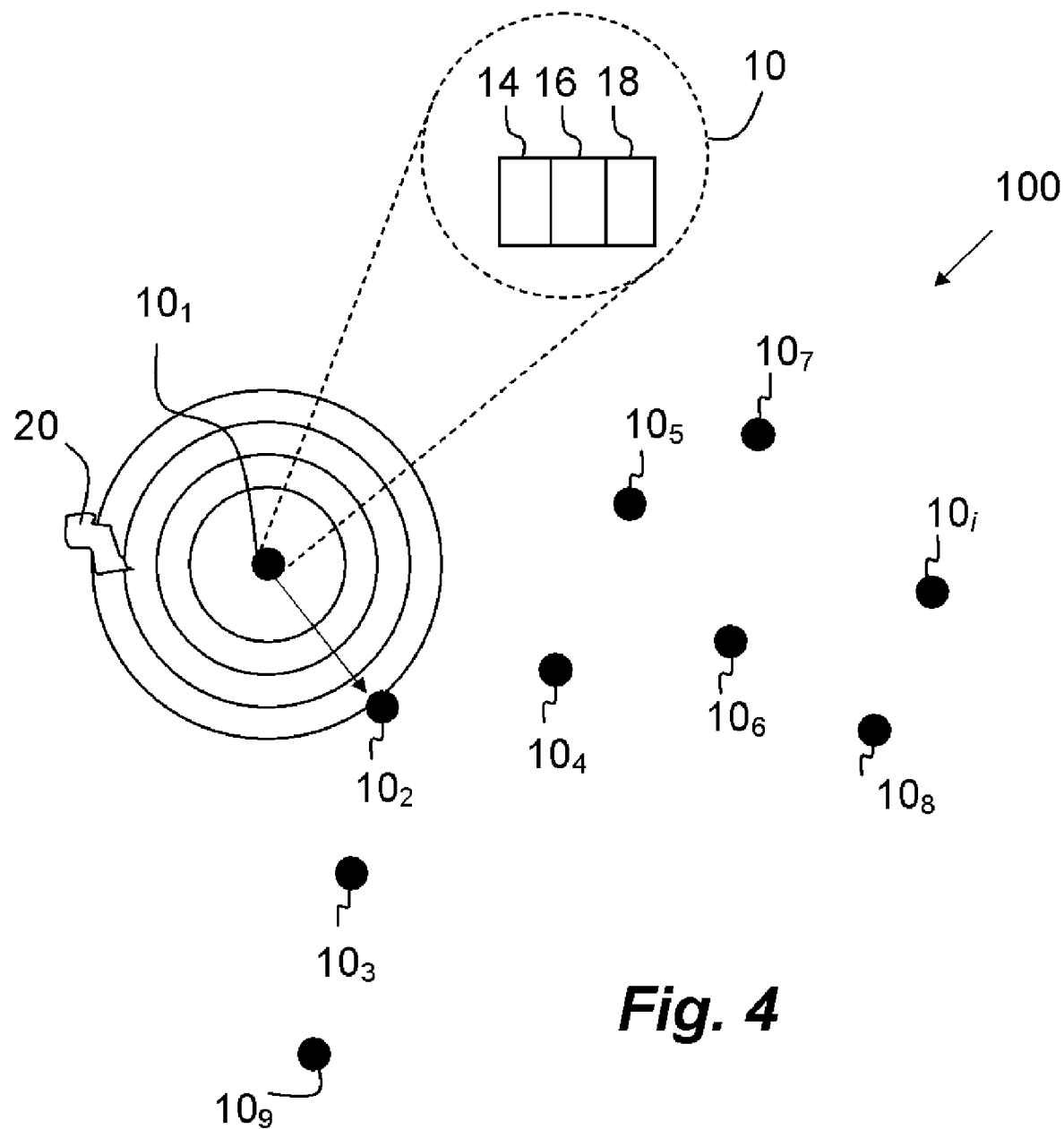
FIG. 4 illustrates a step in the sequence of events in the DAPICS method.

FIG. 4 illustrates a few steps of the DAPICS method 12 in one embodiment of the wireless network 100. First, the sensor 14 in computer node $10_1$ detects an object of interest 20. Then $10_1$'s computer 16 transforms the object detection information into an informational payload of a ping packet using the -p pattern option (reference the command 'man ping' in unix-like systems). Computer node $10_1$ then transmits an echo-request containing the informational payload, via its transceiver 18, to a nearby computer node $10_2$ that is within radio range of computer node $10_1$. Although none are shown in FIG. 1, all other computer nodes 10 within radio range of computer node $10_1$, apart from computer node $10_2$, would receive and archive the echo-request.

Figure 5:
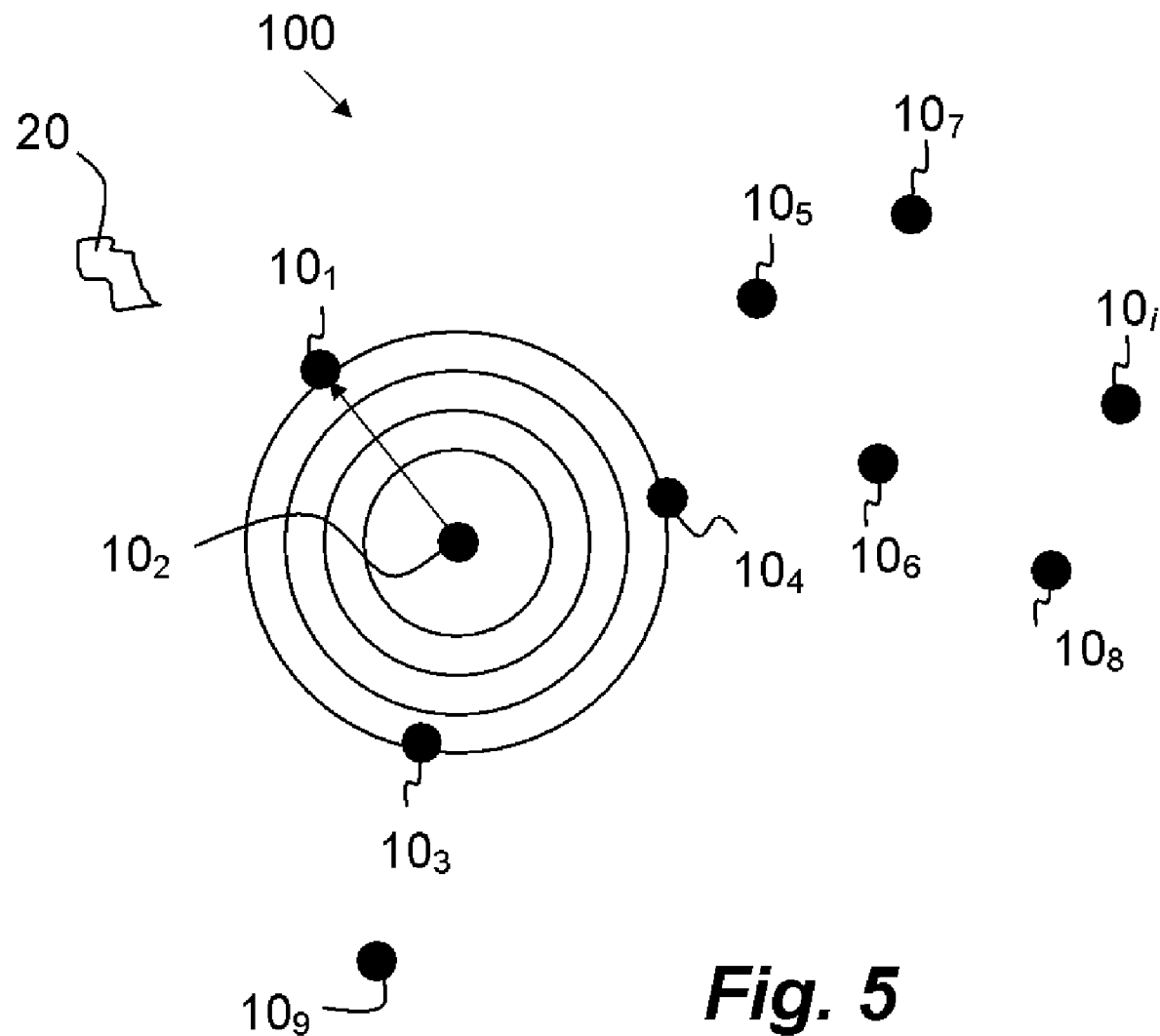
FIG. 5 illustrates a step in the sequence of events in the DAPICS method.

FIG. 5 shows further steps in the DAPICS method 12 in the wireless network 100. After the computer node $10_2$ has received the echo request from computer node $10_1$, computer node $10_2$ transmits an echo-reply back to computer node $10_1$. As shown in FIG. 5, computer nodes $10_3$ and $10_4$ are within radio range of computer node $10_2$ and therefore receive and archive the echo-reply from computer node $10_2$.

Figure 6:
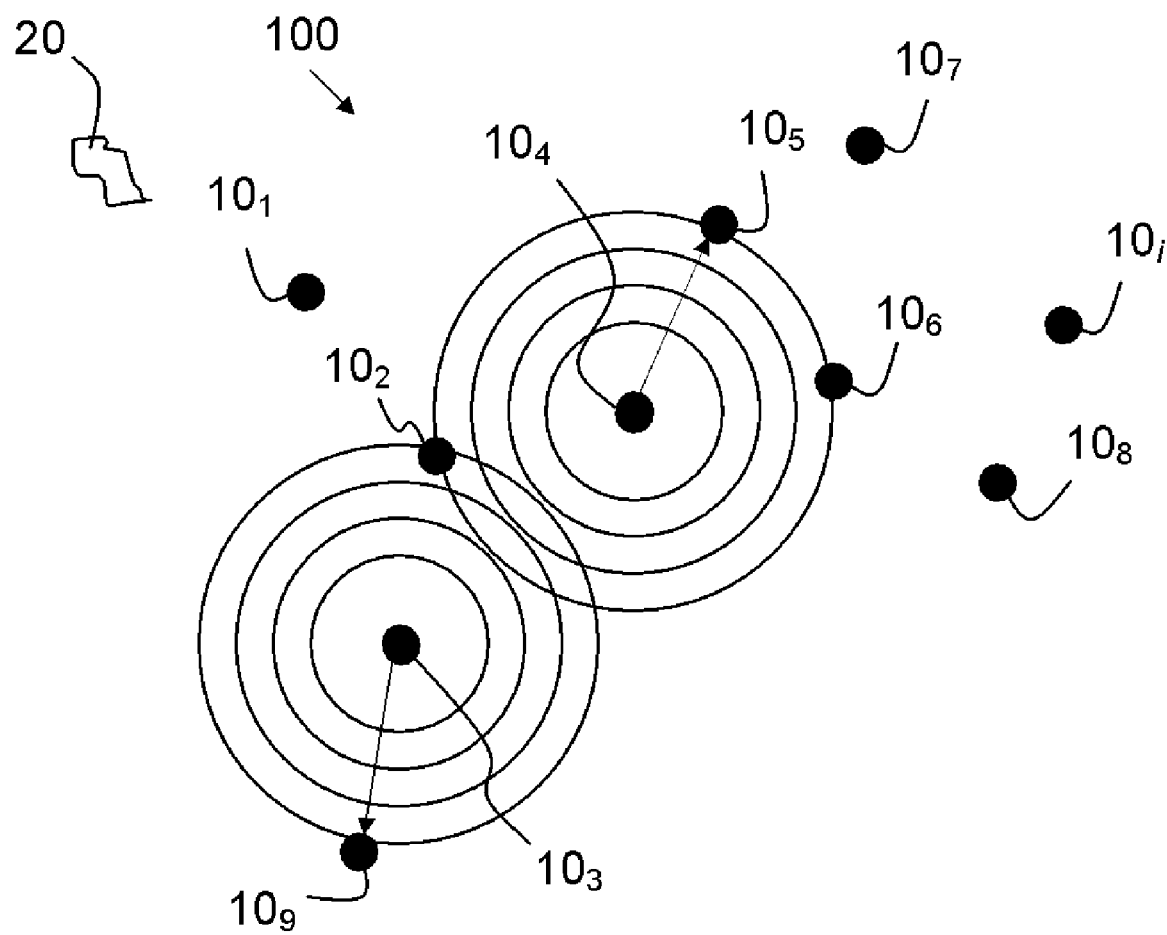
FIG. 6 illustrates a step in the sequence of events in the DAPICS method.

FIG. 6 shows further steps in the DAPICS method in wireless network 100. After receiving and archiving the echo-reply from computer node $10_2$, computer nodes $10_3$ and $10_4$ then each send out an echo-request including the same informational payload, to another computer node, believed to be within radio range, that has not been a recipient or sender of the ping packet as determined from the archived echo-requests and echo-replies. To illustrate, in response to receiving the echo-reply from computer node $10_2$ computer node $10_3$ sends an echo-request to computer node $10_9$, and computer node $10_4$ sends an echo-request to computer node $10_5$. Computer node $10_6$, which is within radio range of computer node $10_4$, then receives and archives the echo-request.

Figure 7:
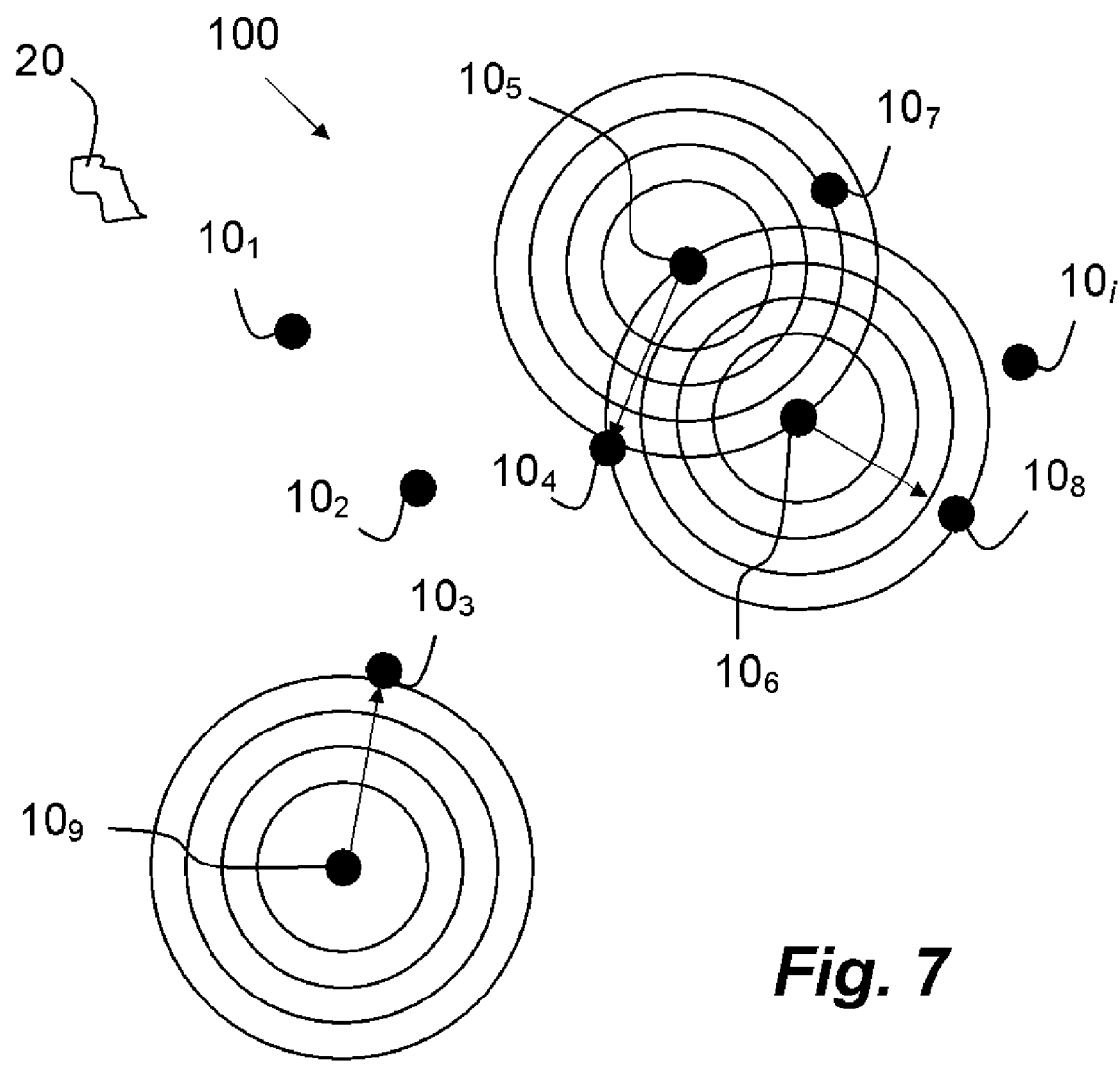
FIG. 7 illustrates a step in the sequence of events in the DAPICS method.

FIG. 7 shows further steps in the DAPICS method in wireless network 100. After computer nodes $10_5$ and $10_9$ have received and archived the echo-requests from computer nodes $10_4$ and $10_3$, respectively, the computer nodes $10_5$ and $10_9$ then send back echo-replies to the requestor computer nodes $10_4$ and $10_3$, respectively. In response to receiving the echo-request from computer node $10_4$, computer node $10_6$ sends an echo-request to another computer node—computer node $10_8$—that is within radio range and has not received the informational payload yet. Computer nodes $10_4$ and $10_5$, will receive and archive the echo-request sent by computer node $10_6$ to computer node $10_8$. The echo-request from computer node $10_6$ will contain the same informational payload as the echo-request and echo-reply sent earlier by computer nodes $10_4$ and $10_5$, respectively. As such, computer nodes $10_4$ and $10_5$ may be configured to refrain from sending out another echo-request with the same informational payload.

Figure 8:
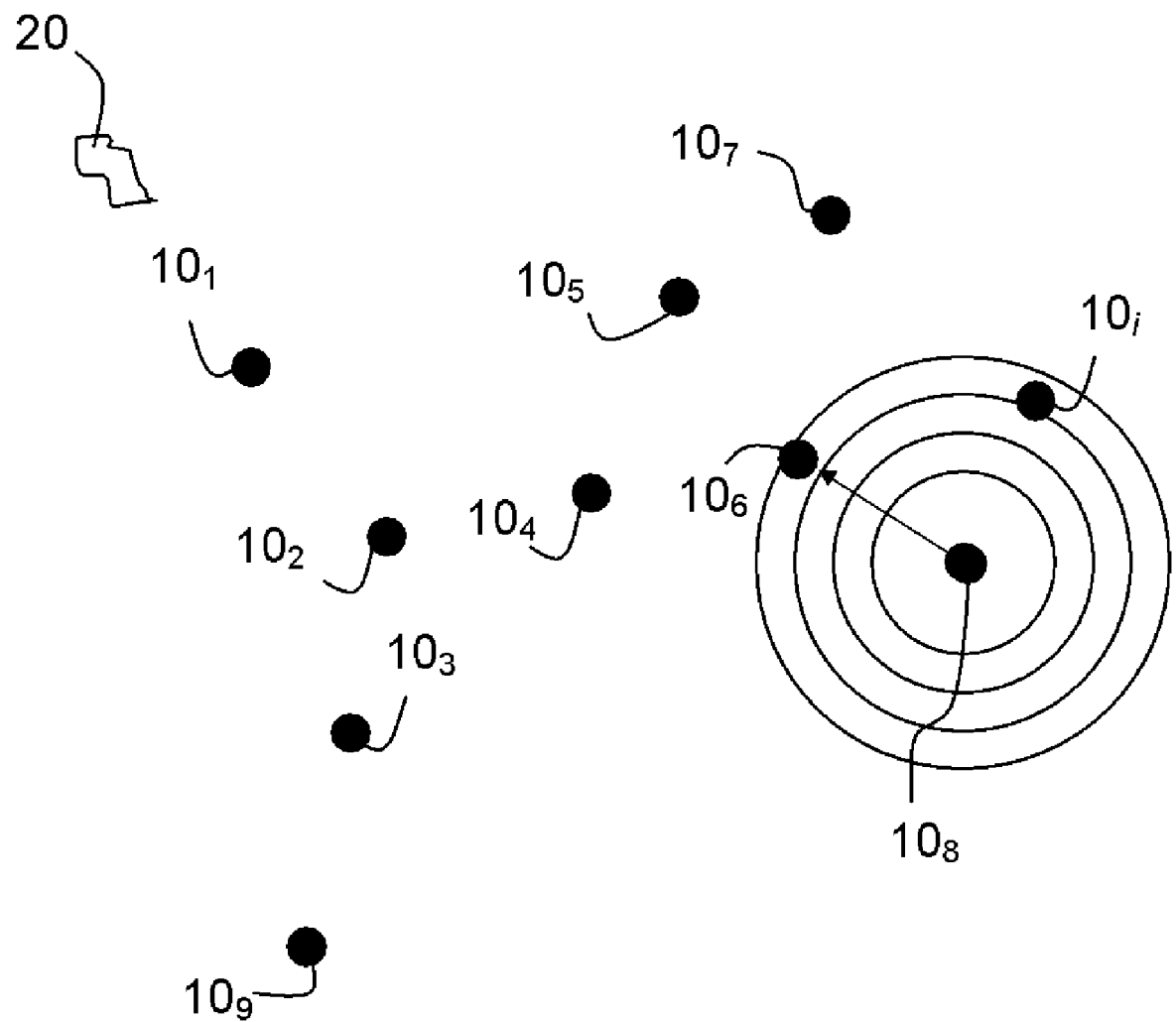
FIG. 8 illustrates a step in the sequence of events in the DAPICS method.

FIG. 8 shows further steps in the DAPICS method in wireless network 100. After the computer node $10_8$ has received the echo request from computer node $10_6$, computer node $10_8$ transmits an echo-reply back to computer node $10_6$. As shown in FIG. 8, computer node $10_i$ is within radio range of computer node $10_8$ and therefore receives and archives the echo-reply from computer node $10_8$. Computer node $10_i$ only transmits a new echo-request if, according to its archived echo-requests and echo-replies, there are other computer nodes 10 within range that haven't received the informational payload (not the case in FIG. 8).

Figure 9:
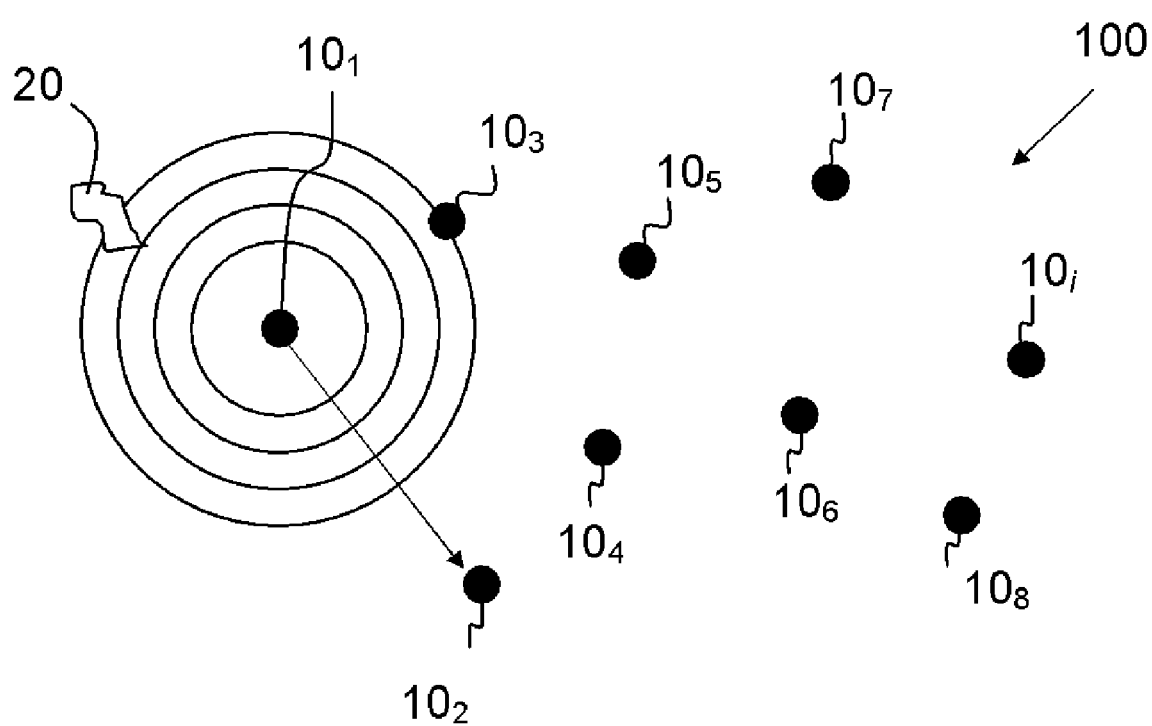
FIG. 9 illustrates an alternative embodiment of the wireless network.
Figure 10:
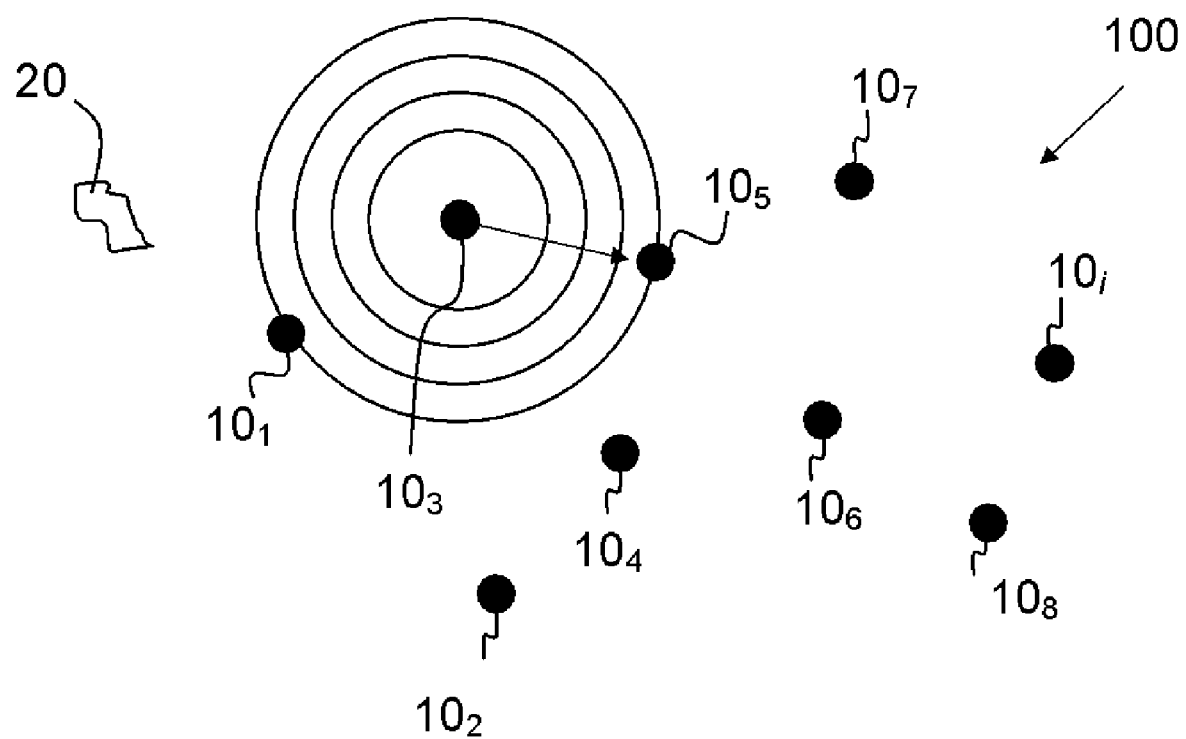
FIG. 10 illustrates an alternative embodiment of the wireless network.

FIGS. 9 and 10 illustrate a scenario where computer node $10_1$ detects an object of interest 20 and then transmits an echo-request containing the informational payload to a nearby computer node $10_2$ that is outside the radio range of computer node $10_1$. However, computer node $10_3$ is within radio range of computer node $10_1$. After receiving and archiving the echo-request from computer node $10_1$, computer node $10_3$ then sends out an echo-request, including the same informational payload, to computer node $10_5$. Thus, even though computer node $10_2$ is out of radio range of computer node $10_1$, in this embodiment, the informational payload can still be propagated throughout the wireless network 100 as long as at least one computer node 10 is within radio range of $10_1$.

Figure 11:
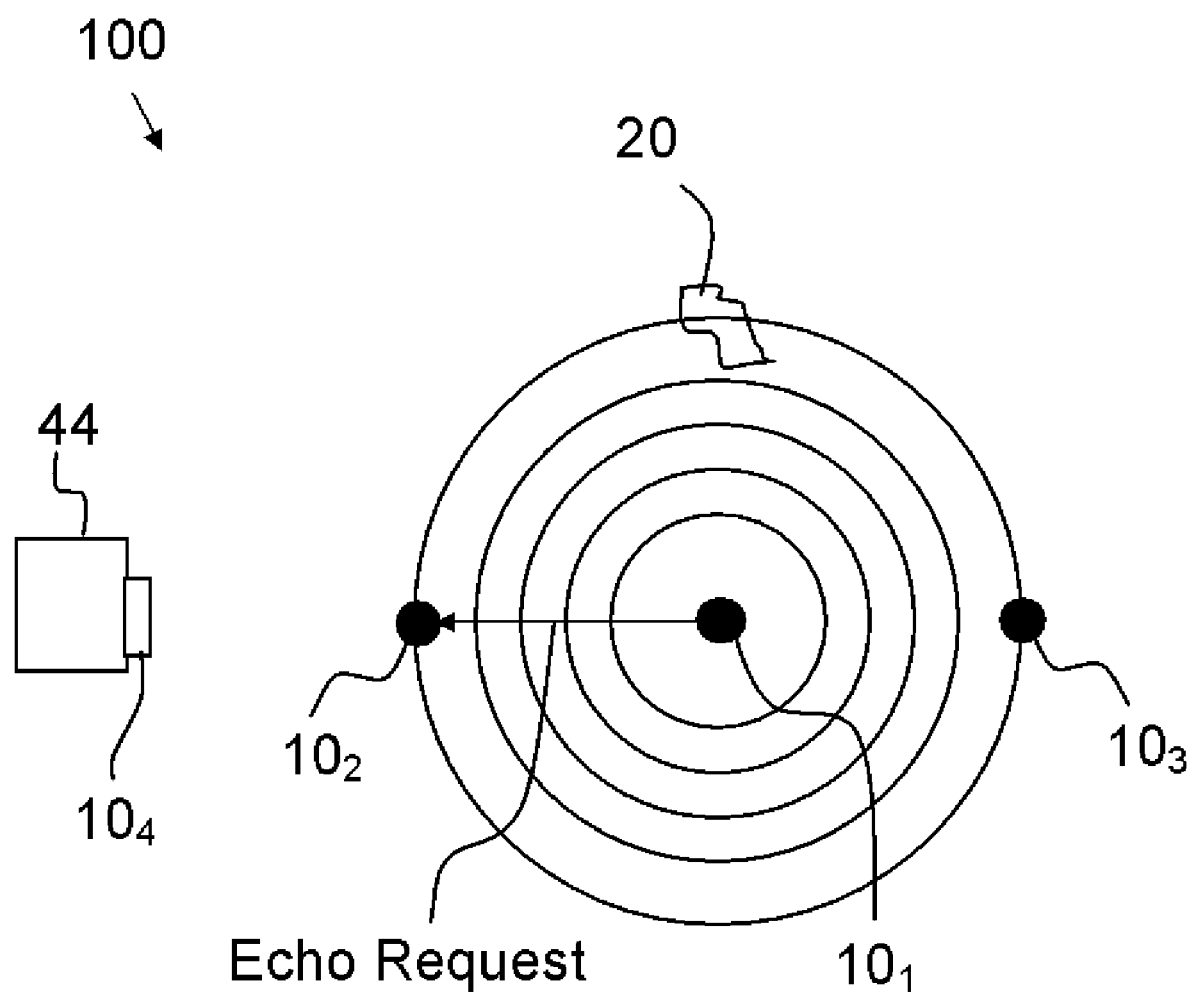
FIG. 11 illustrates an alternative embodiment of the DAPICS method.
Figure 12:
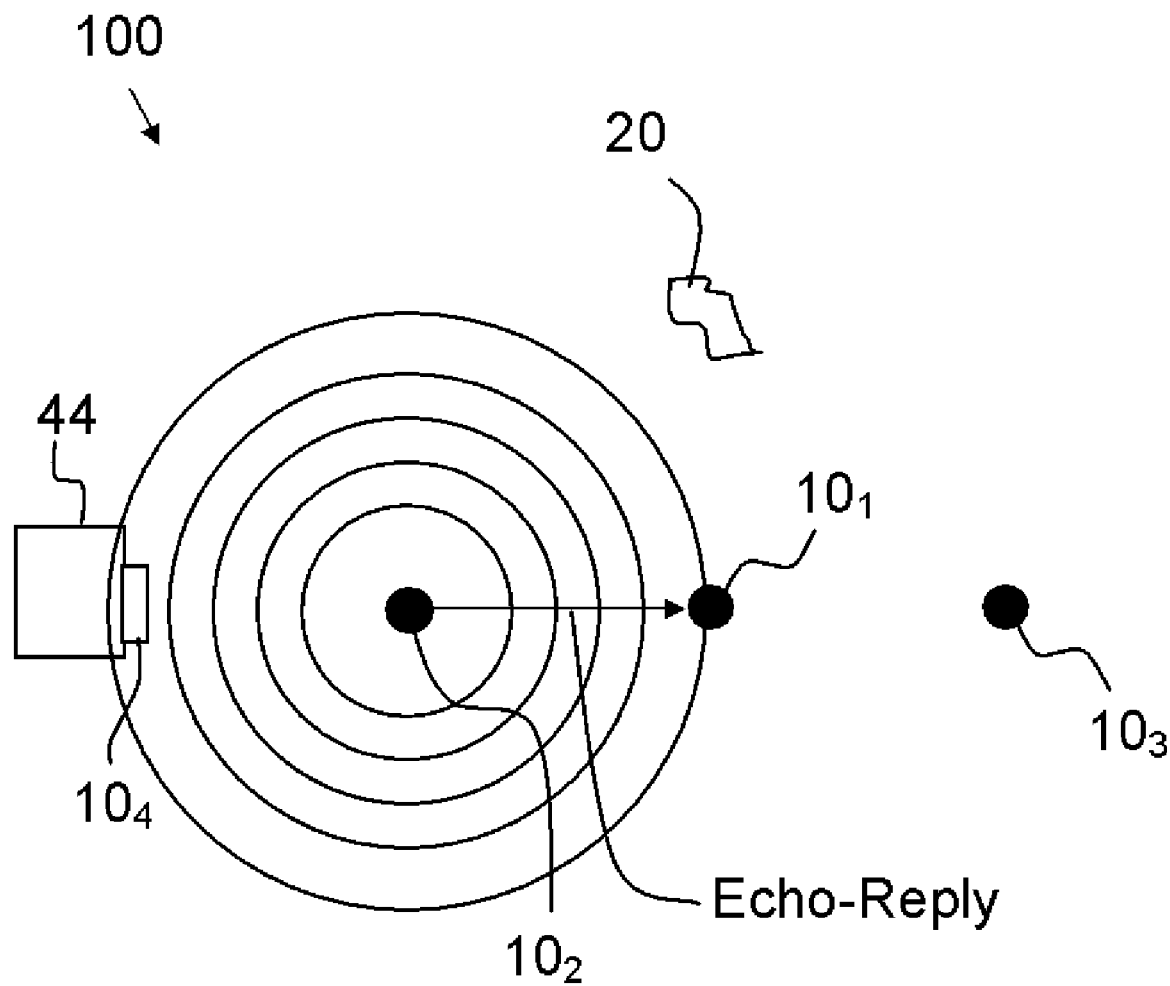
FIG. 12 illustrates an alternative embodiment of the DAPICS method.

FIGS. 11 and 12 depict an alternative embodiment of the DAPICS method 12. In this embodiment, the computer nodes 10 of wireless network 100 are distributed in a line next to a listening station 44, creating a virtual fence. The listening station 44 may have a computer node 10 connected to it, such as computer node $10_4$, as shown in FIGS. 11-12. The listening station 44 is configured to be silent, i.e. configured to receive wireless signals from the computer nodes 10, but not transmit. Although only one listening station 44 is shown in FIGS. 11-12, it is to be understood that there may be any number of listening stations 44. In the scenario depicted in FIGS. 11-12, computer node $10_1$ detects the presence of an object of interest 20 and rapidly propagates the object detection information according to the DAPICS method 12 described above to computer nodes $10_2$, $10_3$, $10_4$, and the listening station 44.

The DAPICS method 12 may be tangibly embodied on a computer-readable medium. The computer-readable medium may comprise, for example, computer memory and/or the nonvolatile storage of a computer. Alternatively, the PICS method may be embodied in a computer-readable medium such as the optical data storage disc. The optical storage disc can be any type of signal bearing disc, for example, a CD-ROM, CD-R, CD-RW, WORM, DVD-R, DVD+R, DVD- RW, or DVD+RW. Whether contained in computer hardware or elsewhere, the PICS method may be stored on any of a variety of machine-readable data storage mediums or media, which may include, for example, direct access storage (such as a conventional "hard drive", a RAID array, or a RAMAC), a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless.

From the above description of the DAPICS method 12, it is manifest that various techniques may be used for implementing the concepts of the method without departing from its scope. The described embodiments are to be considered in all respects as illustrative and not restrictive. It should also be understood that the DAPICS method 12 is not limited to the particular embodiments described herein, but is capable of many embodiments without departing from the scope of the claims.

The invention claimed is:

1. A communication method comprising the steps of:
   a) receiving object of interest detection data from a sensor that is operatively coupled to a first computer node in a wireless network of computer nodes, wherein each computer node has an operating system that behaves in a manner consistent with the Single UNIX® Specification;
   b) transforming the object of interest detection data into an informational payload of a ping packet using a -p[pattern] option to include the payload in the ping packet; and
   c) propagating the payload via echo-replies and echo-requests to all computer nodes in the network, wherein the ping packet is archived in each computer node in an archive file with an ICMP packet capture utility, wherein the propagating further comprises the steps of:
      i) transmitting a first echo request including the payload from the first computer node to a designated computer node;
      ii) receiving and archiving the first echo-request at all computer nodes within radio range of the first computer node (1st stage computer nodes);
      iii) transmitting an echo-reply including the payload from the designated computer node back to the first computer node;
      iv) receiving and archiving the first echo-reply at all computer nodes within radio range of the designated computer node (2nd stage computer nodes);
      v) transmitting from each of the non-designated, 1st and 2nd stage computer nodes another echo request including the payload to another computer node that, as of step (iv), has not been a recipient or sender of the ping packet; and
      vi) repeating the pattern established by steps (i-v) to forward the payload from one computer node to another until all the computer nodes in the network have received the payload.

2. The communication method of claim 1, wherein the computer nodes in the wireless network are Linux computer nodes.

3. The method of claim 2, wherein each of the computer nodes is operatively coupled to a corresponding sensor.

4. The method of claim 3, further comprising the step of maintaining local tables of network neighbors, and neighbors of neighbors based on archived ping packets, thus enabling choice of relay (ping recipient) that is most strongly connected to other computer nodes in the network.

5. The method of claim 4, wherein the ping packet includes the local time stamp of when the sensor information was received by the first computer node.

6. The method of claim 5, wherein the ping packet further includes gps coordinates of the given computer node.

7. The method of claim 6, wherein the ping packet consists of 32 bytes of hexadecimal symbols.

8. The method of claim 7, wherein the packet capture utility is tcpdump.

9. The method of claim 8, wherein the computer nodes are mounted to mobile platforms.

10. The method of claim 9, wherein the wireless network is ad-hoc.

11. The method of claim 10, wherein the wireless network and sensors are designed to operate in an aqueous environment.

12. A non-transitory computer readable medium, tangibly embodying a program of instructions executable by a computer for performing a method for distributing information between network nodes, the method comprising:
   a) receiving object of interest detection data from a sensor that is operatively coupled to a first computer node in a wireless network of computer nodes, wherein each computer node has an operating system that behaves in a manner consistent with the Single UNIX® Specification;
   b) transforming the object of interest detection data into an informational payload of a ping packet using a -p[pattern] option to include the payload in the ping packet; and
   c) propagating the payload via echo-replies and echo-requests to all computer nodes in the network, wherein the ping packet is archived in each computer node in an archive file with an ICMP packet capture utility, wherein the propagating further comprises the steps of:
      i) transmitting a first echo request including the payload from the first computer node to a designated computer node;
      ii) receiving and archiving the first echo-request at all computer nodes within radio range of the first computer node (1st stage computer nodes);
      iii) transmitting an echo-reply including the payload from the designated computer node back to the first computer node;
      iv) receiving and archiving the first echo-reply at all computer nodes within radio range of the designated computer node (2nd stage computer nodes);
      v) transmitting from each of the non-designated, 1st and 2nd stage computer nodes another echo request including the payload to another computer node that, as of step (iv), has not been a recipient or sender of the ping packet; and
      vi) repeating the pattern established by steps (i-v) to forward the payload from one computer node to another until all the computer nodes in the network have received the payload.

13. The computer readable medium of claim 12, wherein the computer nodes in the wireless network are linux computer nodes.

14. The computer readable medium of claim 13, wherein the method for distributing information between network nodes further comprises the step of maintaining local tables of network neighbors, and neighbors of neighbors based on archived ping packets, thus enabling choice of relay (ping recipient) that is most strongly connected to other computer nodes in the network.

15. The computer readable medium of claim 14, wherein the ICMP packet capture utility is tcpdump.

16. The computer readable medium of claim 15, wherein the method for distributing information between network nodes further comprises the step of: including in each ping packet the local time stamp of when the sensor information was received by the first computer node.

17. The computer readable medium of claim 16 wherein the ping packet further includes gps coordinates of the given computer node.

18. The computer readable medium of claim 17, wherein the computer nodes are mounted to mobile platforms.

* * * * *